(12) United States Patent
Kim et al.

(10) Patent No.: US 11,355,815 B2
(45) Date of Patent: Jun. 7, 2022

(54) SEPARATOR FOR RECHARGEABLE LITHIUM BATTERY, AND METHOD FOR PREPARING THE SAME, AND RECHARGEABLE LITHIUM BATTERY INCLUDING THE SAME

(71) Applicant: SAMSUNG SDI CO., LTD., Yongin-si (KR)

(72) Inventors: Byung-Soo Kim, Suwon-si (KR); Jaehyun Cho, Suwon-si (KR); Dowon Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 206 days.

(21) Appl. No.: 16/737,410

(22) Filed: Jan. 8, 2020

(65) Prior Publication Data

US 2020/0227711 A1    Jul. 16, 2020

(30) Foreign Application Priority Data

Jan. 10, 2019 (KR) .................. 10-2019-0003519

(51) Int. Cl.
*H01M 50/431* (2021.01)
*H01M 10/0525* (2010.01)
*H01M 10/0565* (2010.01)
*H01M 50/403* (2021.01)

(52) U.S. Cl.
CPC ..... *H01M 50/431* (2021.01); *H01M 10/0525* (2013.01); *H01M 10/0565* (2013.01); *H01M 50/403* (2021.01)

(58) Field of Classification Search
None
See application file for complete search history.

(56) References Cited

U.S. PATENT DOCUMENTS

| | | | |
|---|---|---|---|
| 9,331,331 B1 * | 5/2016 | Wang | H01M 4/622 |
| 9,887,406 B2 | 2/2018 | Honda et al. | |
| 2009/0280412 A1 | 11/2009 | Imanari et al. | |
| 2010/0159314 A1 | 6/2010 | Kim et al. | |
| 2013/0059192 A1 * | 3/2013 | Kajita | H01M 50/446 429/143 |
| 2013/0236765 A1 | 9/2013 | Zhang et al. | |
| 2013/0323595 A1 | 12/2013 | Sohn et al. | |
| 2015/0024249 A1 | 1/2015 | Lim et al. | |
| 2015/0349307 A1 | 12/2015 | Dadheech et al. | |
| 2016/0204407 A1 | 7/2016 | Kai et al. | |
| 2016/0322620 A1 | 11/2016 | Kim et al. | |
| 2017/0222205 A1 | 8/2017 | Zhang et al. | |
| 2019/0190072 A1 | 6/2019 | Kashiwazaki et al. | |
| 2020/0335759 A1 | 10/2020 | Lane et al. | |

FOREIGN PATENT DOCUMENTS

| | | | |
|---|---|---|---|
| JP | 2008-098154 A | | 4/2008 |
| JP | 2010-027552 A | | 2/2010 |
| JP | 2016-085949 A | | 5/2016 |
| JP | 6430618 B1 | | 11/2018 |
| JP | 2020-068094 | * | 4/2020 |
| KR | 10-2006-0072065 A | | 6/2006 |
| KR | 10-2007-0000231 A | | 1/2007 |
| KR | 10-2007-0082579 A | | 8/2007 |
| KR | 10-2014-0114428 A | | 9/2014 |
| KR | 10-2015-0053176 A | | 5/2015 |
| KR | 10-1584627 B1 | | 1/2016 |
| KR | 10-2016-0069431 A | | 6/2016 |
| KR | 10-2018-0041502 A | | 4/2018 |
| WO | WO 2015-037552 A1 | | 3/2015 |
| WO | WO 2018/017944 | * | 1/2018 |
| WO | WO 2018-017944 A1 | | 1/2018 |

OTHER PUBLICATIONS

Machine translation of JP 2020-068094, published on Apr. 30, 2020 (Year: 2020).*

Chinese Office dated Jan. 26, 2022 and Chinese Search Report dated Jan. 20, 2022.

* cited by examiner

*Primary Examiner* — Anca Eoff (74) *Attorney, Agent, or Firm* — Lee IP Law, PC (57) ABSTRACT

A separator for a rechargeable battery includes a porous substrate, and a coating layer including a plurality of annular patterns on at least one surface of the porous substrate. The annular patterns may include a plurality of polymer microparticles, the annular patterns may have an average particle diameter (D50) of about 50 μm to about 500 μm, and rings of the annular patterns may have a ring width of about 5 μm to about 50 μm.

17 Claims, 5 Drawing Sheets

SEPARATOR FOR RECHARGEABLE LITHIUM BATTERY, AND METHOD FOR PREPARING THE SAME, AND RECHARGEABLE LITHIUM BATTERY INCLUDING THE SAME

CROSS-REFERENCE TO RELATED APPLICATION

Korean Patent Application No. 10-2019-0003519, filed on Jan. 10, 2019, in the Korean Intellectual Property Office, and entitled: "Separator for Rechargeable Lithium Battery, and Method for Preparing the Same, and Rechargeable Lithium Battery Including the Same," is incorporated by reference herein in its entirety.

BACKGROUND

1. Field

Embodiments relate to a separator for a rechargeable lithium battery, a method of preparing the same, and a rechargeable lithium battery including the same.

2. Description of the Related Art

In a rechargeable lithium battery, a positive electrode and a negative electrode including a material capable of intercalating and deintercalating lithium ions may be impregnated with an electrolyte, and a separator may be disposed between the positive electrode and the negative electrode. The separator may provide a movement path of ions in the electrolyte while preventing direct contact (and thus an internal short-circuit) between the positive electrode and the negative electrode.

SUMMARY

Embodiments are directed to a separator for a rechargeable battery, the separator including a porous substrate, and a coating layer including a plurality of annular patterns on at least one surface of the porous substrate. The annular patterns may include a plurality of polymer microparticles, the annular patterns may have an average particle diameter (D50) of about 50 μm to about 500 Aim, and rings of the annular patterns may have a ring width of about 5 μm to about 50 Am.

The annular patterns may have an average particle diameter (D50) of about 80 μm to about 350 μm.

The annular patterns may have a ring width of about 5 μm to about 45 μm.

The polymer microparticles may include polyvinylidene fluoride-based polymer microparticles, (meth)acryl-based polymer microparticles, or a mixture thereof.

An average particle diameter (D50) of the polymer microparticles may be about 100 nm to about 600 nm.

The polymer microparticles may include the polyvinylidene fluoride-based polymer microparticles, and the polyvinylidene fluoride-based polymer microparticles may include one or more of polyvinylidene fluoride, polyvinylidene fluoride-co-hexafluoropropylene, or polyvinylidene fluoride-co-trichloroethylene.

The polymer microparticles may include the (meth)acryl-based polymer microparticles, and the (meth)acryl-based polymer microparticles may include one or more of polyacrylate, polymethacrylate, polybutylacrylate, or polyacrylonitrile.

The annular patterns may have a loading amount on the porous substrate of about 0.5 $g/m^2$ to about 1.5 $g/m^2$.

The coating layer may have a thickness of about 0.1 μm to about 5 μm.

A total area of the annular patterns may be about 40% to about 80% of a total area of the porous substrate, and a total area of ring portions of the annular patterns may be about 10% to about 40% of the total area of the porous substrate.

A method of preparing a separator may include mixing water with at least one of polyvinylidene fluoride-based polymer microparticles, (meth)acryl-based polymer microparticles, and a mixture thereof to prepare a coating layer composition, and coating the coating layer composition on at least one surface of the porous substrate by a spray coating method and drying the same.

The coating layer composition may have a viscosity of about 0.1 cps to about 10 cps.

The coating layer composition may include the polyvinylidene fluoride-based polymer microparticles and the (meth)acryl-based polymer microparticles in a weight ratio of about 90:10 to about 50:50.

An average particle diameter (D50) of the polyvinylidene fluoride-based polymer microparticles may be about 100 nm to about 300 nm.

An average particle diameter (D50) of the (meth)acryl-based polymer microparticles may be about 300 nm to about 600 nm.

The spray coating method may be performed by spraying at room temperature with an air pressure of about 0.2 bar to about 3.0 bar and a pulse of about 20% to about 80%.

A rechargeable lithium battery may include a positive electrode including a positive active material, a negative electrode including a negative active material, a separator according to an embodiment disposed between the positive electrode and the negative electrode, and an electrolyte solution.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

Hereinafter, a separator according to an example embodiment is described with reference to FIGS. 1 and 2.

Figure 1:
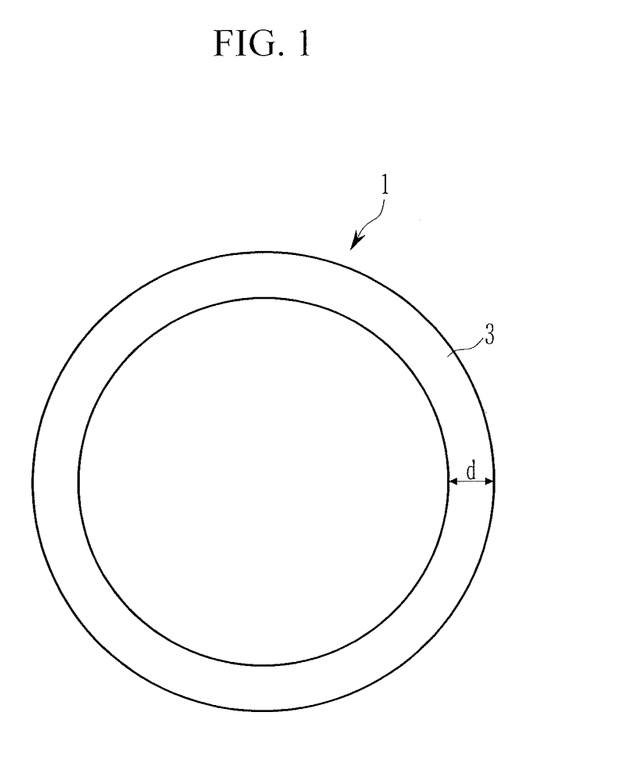
FIG. 1 illustrates a schematic view showing an annular pattern included in the coating layer of the separator according to an example embodiment.

FIG. 1 is a schematic view of an annular pattern included in a coating layer of a separator according to an example embodiment. FIG. 2 is a schematic view showing a coating layer of a separator according to an example embodiment.

Figure 2:
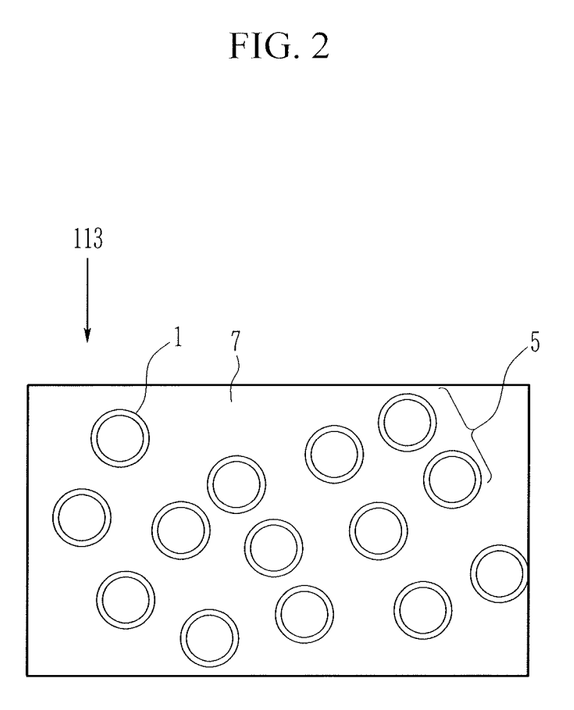
FIG. 2 illustrates a schematic view showing a coating layer of a separator according to an example embodiment.

Referring to FIGS. 1 and 2, according to the present example embodiment, a separator 113 may include a porous substrate 7 and a coating layer 5 on at least one surface of the porous substrate 7. The coating layer 5 of the separator may include a plurality of annular patterns 1. Each annular pattern 1 may include a plurality of polymer microparticles. An average particle diameter of the annular pattern 1 may be about 50 µm to about 500 µm. A ring portion 3 of the annular pattern 1 may have a ring width (ring thickness) of about 5 µm to about 50 µm.

As described above, a plurality of polymer microparticles may be included in the ring portion 3 of the annular pattern 1. The polymer microparticles may be substantially absent from the center of the annular pattern 1, i.e., except the ring portion 3, or may be present in the center a very small loading amount, e.g., less than or equal to about 50% than the ring.

According to the present example embodiment, a phenomenon of the separator being swollen due to a side reaction with an electrolyte solution may be improved by minimizing clogging of pores, as compared with a case where the entire surface of the porous pattern or the porous substrate filled with the polymer material is evenly coated with the polymer material, and thus ion conductivity may be improved according to the present example embodiment.

A numerical range of the average particle diameter of the annular pattern 1 and a width of the ring 3 (a thickness (d) of the ring) may affect an adhesive force between the electrode and the separator. In this regard, according to the present example embodiment, the annular pattern 1 may have an average particle diameter of about 50 µm to about 500 µm, for example, an average particle diameter of about 80 µm to about 350 µm, and the width of the ring portion 3 of the annular pattern 1 may be about 5 µm to about 50 µm, for example, about 5 µm to about 45 µm, about 5 µm to about 30 µm, or about 10 µm to about 30 µm.

When the average particle diameter of the annular pattern 1 and the width (the ring thickness) of the ring portion 3 fall within the above ranges, adhesion between the electrode and the separator may be improved and interfacial resistance may be minimized to improve battery life characteristics.

The polymer microparticles may include one or more of polyvinylidene fluoride (PVdF)-based polymers, (meth)acryl-based polymers, or mixtures thereof. The average particle diameter (D50) of the polymer microparticles may be, for example, about 100 nm to about 600 nm.

The (meth)acryl-based polymer microparticles may include, for example, a methacrylic polymer, an acrylic polymer, or a combination thereof.

An average particle diameter (D50) of the (meth)acryl-based polymer microparticles may be, for example, greater than or equal to about 50 nm, greater than or equal to about 100 nm, or greater than or equal to about 150 nm, and less than or equal to about 600 nm, less than or equal to about 550 nm, less than or equal to about 500 nm, or less than or equal to about 450 nm.

When the average particle diameter of the (meth)acryl-based polymer microparticles falls within the above ranges, migration resistance of lithium ions may be minimized to enhance performance of a rechargeable lithium battery.

The polyvinylidene fluoride-based polymer microparticles may include, for example, polyvinylidene fluoride (PVdF), polyvinylidene fluoride-co-hexafluoropropylene, or polyvinylidene fluoride-co-trichloroethylene. The (meth)acryl-based polymer microparticles may include, for example, one or more of polyacrylate, polymethacrylate, polybutylacrylate, polybutyl methacrylate, or polyacrylonitrile.

An average particle diameter (D50) of the polyvinylidene fluoride polymer microparticles may be, for example, about 100 nm to about 300 nm, for example, about 100 nm to about 250 nm, about 100 nm to about 200 nm, or about 150 nm to about 200 nm.

Adhesion between the separator 113 and electrodes and an oxidation resistance may be improved when the average particle diameter of the polyvinylidene fluoride-based polymer microparticles falls within the above ranges, and a migration resistance of lithium ions may be minimized and a thickness of the coating layer 5 may be minimized to enhance performance of a rechargeable lithium battery.

According to the present example embodiment, a loading amount of the annular pattern 1 may be in a range of, for example, about 0.5 g/m$^2$ to about 1.5 g/m$^2$, for example, about 0.7 g/m$^2$ to about 1.3 g/m$^2$, or about 1.0 g/m$^2$ to about 1.2 g/m$^2$. When the loading amount of the annular pattern 1 is within the range, adherence and ion conductivity of the separator 113 may be improved, and interface resistance between an electrode and the separator 113 may be reduced. Accordingly, cycle-life characteristics of a rechargeable lithium battery may be improved.

The coating layer 5 may have a thickness (for example, a total thickness) of, for example, about 0.1 µm to about 5 µm, for example, about 1 µm to about 2 µm, or about 1.3 µm to about 1.6 µm.

In the coating layer 5, an area of the annular pattern 1 may be, for example, about 40% to about 80%, for example about 50% to about 80% of a total area of the porous substrate 7. In the coating layer 5, an area of the ring portion 3 of the annular pattern 1 may be, for example, about 10% to about 40%, for example about 20% to about 40% of a total area of the porous substrate 7. In the coating layer 5, when the area of the annular pattern 1 and the area of the ring portion 3 of the annular pattern 1 are respectively within the ranges, appropriate adherence between the separator 113 and an electrode may be maintained, while resistance on the interface thereof is reduced, and accordingly, cycle-life characteristics of a battery may be improved.

The area of the annular pattern 1 indicates an area sum of the area of the ring portion 3 of the annular pattern and an area of an inner region of the annular pattern 1 except for the ring portion 3.

Hereinafter, a method of preparing a separator according to an example embodiment is described.

An example embodiment provides a method of preparing the separator that includes mixing water with one or more of polyvinylidene fluoride-based polymer microparticles, (meth)acryl-based polymer microparticles, or a mixture thereof to prepare a coating layer composition, and coating the coating layer composition on at least one surface of a porous substrate, for example, by a spray coating method, and drying the same.

The polyvinylidene fluoride-based polymer microparticles may include, for example, polymer microparticles having an average particle diameter (D50) of about 100 nm to about 300 nm, for example, about 100 nm to about 250 nm, about 100 nm to about 200 nm, or about 150 nm to about 200 nm. The (meth)acryl-based polymer microparticles may have an average particle diameter (D50) of, for example, greater than or equal to about 250 nm, greater than or equal to about 300 nm, or greater than or equal to about 350 nm and less than or equal to about 600 nm, less than or equal to about 550 nm, or less than or equal to about 500 nm.

When using a mixture of polyvinylidene fluoride-based polymer microparticles and (meth)acryl-based polymer microparticles, the coating layer composition may include the polyvinylidene fluoride-based polymer microparticles and the (meth)acryl-based polymer microparticles in a weight ratio of, for example, about 90:10 to about 50:50, about 90:10 to about 55:45, about 90:10 to about 60:40, about 90:10 to about 65:35, or about 90:10 to about 70:30. When the binder composition includes the polymer microparticles within the range, interface resistance between the electrode and the separator may be reduced, while adherence of the separator may be improved, and accordingly, cycle-life characteristics of a battery may be improved.

The coating layer composition may have viscosity in a range of, for example, greater than or equal to about 0.1 cps, greater than or equal to about 0.5 cps, greater than or equal to about 1 cps, or greater than or equal to about 2 cps and less than or equal to about 50 cps, less than or equal to about 45 cps, less than or equal to about 40 cps, less than or equal to about 35 cps, less than or equal to about 30 cps, less than or equal to about 25 cps, less than or equal to about 20 cps, less than or equal to about 15 cps, less than or equal to about 10 cps, or less than or equal to about 7 cps. When the coating layer composition has viscosity within the range, an annular pattern having a ring shape and an average particle diameter and a width thereof may be well formed. When the coating layer composition has too low or too high viscosity, it may be difficult to use a spray coating method, or even though the spray coating is used, the average particle diameter and the width of the ring of the annular pattern may not be satisfactory.

The spray coating method may be performed by, for example, spraying at room temperature with a pressure (air pressure) of about 0.2 bar to about 3.0 bar and a pulse (nozzle opening and opening-closing rate) of about 20% to about 80%. When the spray coating is performed under conditions within the ranges, an annular pattern having an average particle diameter and a thickness of a ring may be well formed on a porous substrate. In addition, adherence between separator and electrode may be improved, while resistance on the interface may be reduced, and accordingly, cycle-life characteristics of a battery may be improved.

A spray coater used for forming the separator according to an example embodiment may simultaneously adjust a liquid pressure (L) and an air pressure (A) by applying a pulse method (a pulse range: 0% to 100%) adjusting an opening-closing degree of a nozzle and spraying time with a magnetic bar and in addition, spray by mixing air and a liquid (a solution) from the nozzle. For example, the coating layer may be formed under the following operation conditions.

Tank pressurization method (CDA)
Nozzle tip size: 0.38 mm
Nozzle injection angle: 85 degrees
Liquid pressure: adjustable in a range of 0.2 to 80 bar
Air pressure: adjustable in a range of 0.2 to 3.0 bar
Spray height: 250 mm (based on film)
Pulse: adjustable in a range of 0% to 100%

Another example embodiment provides a rechargeable lithium battery that includes the separator. The rechargeable lithium battery according to the present example embodiment includes a positive electrode including a positive active material; a negative electrode including a negative active material; the separator disposed between the positive electrode and the negative electrode; and an electrolyte solution.

The rechargeable lithium battery may be classified into a lithium ion battery, a lithium ion physical gel polymer battery, and a lithium ion chemical gel polymer battery according to types of separators and electrolyte solutions thereof. It may be classified into cylindrical, prismatic, coin-type, or pouch according to a shape, and may be classified into a bulk type and a thin film type according to a size. Structures and manufacturing methods for lithium ion batteries may be suitably selected.

Figure 3:
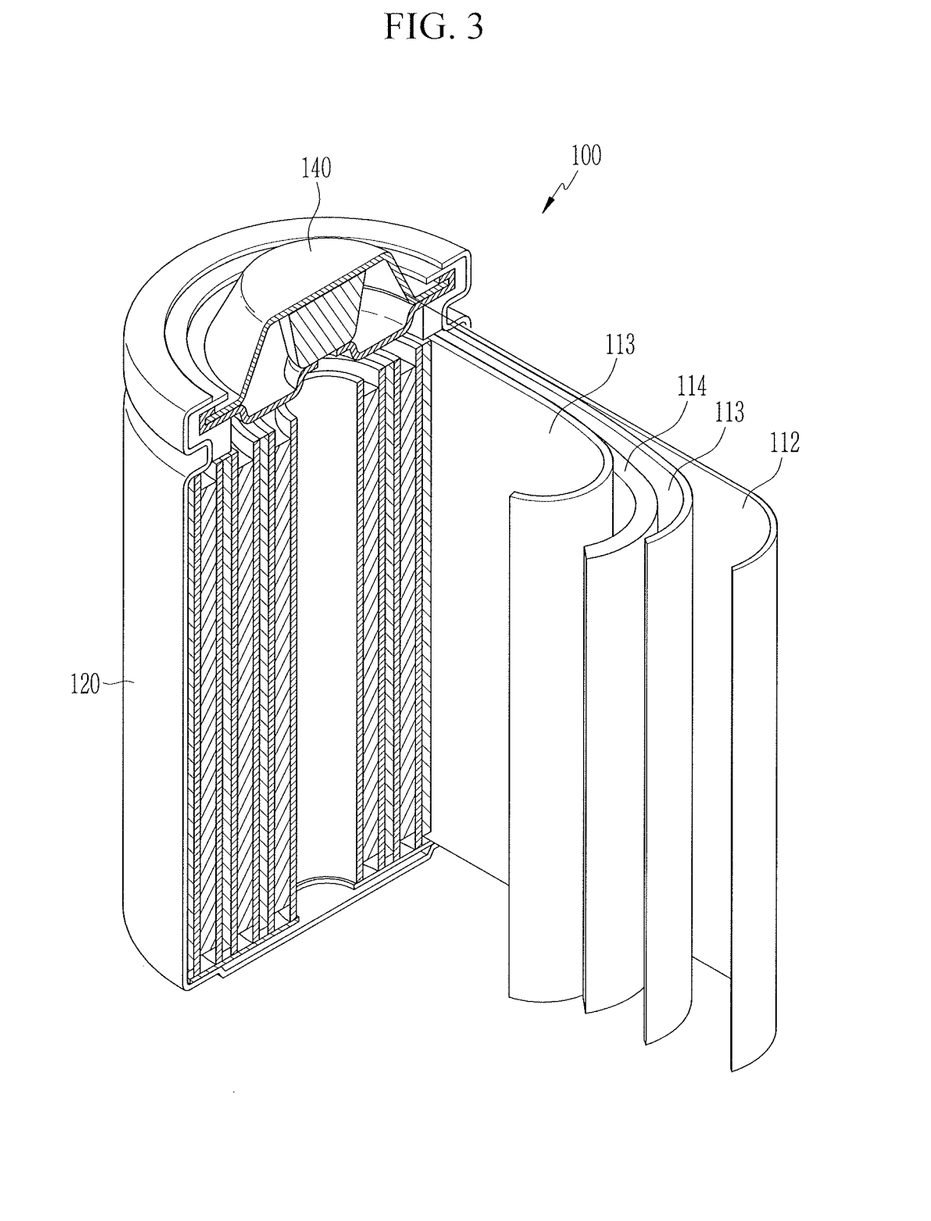
FIG. 3 illustrates an exploded perspective view showing a rechargeable lithium battery according to an example embodiment.

FIG. 3 is an exploded perspective view of a rechargeable lithium battery according to an example embodiment. Referring to FIG. 3, a rechargeable lithium battery 100 according to the present example embodiment is a cylindrical battery that includes a negative electrode 112, a positive electrode 114, the separator 113 disposed between the negative electrode 112 and the positive electrode 114, an electrolyte (not shown) impregnating the negative electrode 112, positive electrode 114, and the separator 113, a battery case 120, and a sealing member 140 sealing the battery case 120. The rechargeable lithium battery 100 may be fabricated by sequentially laminating the negative electrode 112, the separator 113, and the positive electrode 114, spirally winding them, and housing the spiral-wound product in a battery case 120.

The separator 113 separates a positive electrode 114 and a negative electrode 112 and provides a transporting passage for lithium ions. Detailed descriptions thereof are as described above. The overall thickness of the separator may be determined by a target capacity of the battery. A thickness of the separator may be, for example, about 5 μm to about 30 μm.

The negative electrode 112 includes a current collector and a negative active material layer formed on the current collector and, and the negative active material layer includes a negative active material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material which is any generally-used carbon-based negative active material in a rechargeable lithium ion battery. Examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon (fired carbon at a low temperature) or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping and dedoping lithium may be Si, $SiO_x$ (0<x<2), a Si—C composite, a Si-Q alloy (wherein Q is selected from an alkali metal, an alkaline-earth metal, Group 13 to 16 elements, a transition element, a rare earth element, and a combination thereof, and not Si), Sn, $SnO_2$, a Sn—C composite, Sn—R (wherein R is selected from an alkali metal, an alkaline-earth metal, Group 13 to 16 elements, a transition element, a rare earth element, and a combination thereof, and not Sn). The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition elements oxide may include a vanadium oxide, a lithium vanadium oxide, and the like.

The negative active material layer may also include a binder and/or a conductive material.

The binder improves binding properties of negative active material particles with one another and with a current collector. Examples thereof may be polyvinylalcohol, carboxymethylcellulose, hydroxypropylcellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material improves electrical conductivity of an electrode. A suitable electrically conductive material may be used as a conductive material that does not cause a chemical change. Examples thereof may be a carbon-based material such as natural graphite, artificial graphite, carbon black, acetylene black, ketjen black, a carbon fiber and the like; a metal-based material such as a metal powder, a metal fiber, and the like of copper, nickel, aluminum, silver, and the like; a conductive polymer such as a polyphenylene derivative and the like; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode 114 includes a current collector and a positive active material layer formed on the current collector.

The positive active material may be a compound (lithiated intercalation compound) capable of intercalating and deintercalating lithium. For example, at least one lithium metal composite oxide of lithium and a metal of cobalt, manganese, nickel, or a combination thereof may be used, and specific examples thereof may be a compound represented by one of the following chemical formulae. $Li_aA_{1-b}R_bD_2$ (wherein, in the above chemical formula, $0.90 \leq a \leq 1.8$ and $0 \leq b \leq 0.5$); $Li_aE_{1-b}R_bO_{2-c}D_c$ (wherein, in the above chemical formula, $0.90 \leq a \leq 1.8$, $0 \leq b \leq 0.5$ and $0 \leq c \leq 0.05$); $LiE_{2-b}R_bO_{4-c}D_c$ (wherein, in the above chemical formula, $0 \leq b \leq 0.5$, $0 \leq c \leq 0.05$); $Li_aNi_{1-b-c}Co_bR_cD_\alpha$ (wherein, in the above chemical formula, $0.90 \leq a \leq 1.8$, $0 \leq b \leq 0.5$, $0 \leq c \leq 0.05$ and $0 \leq \alpha \leq 2$); $Li_aN_{1-b-c}Co_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < a < 2$); $Li_aNi_bE_cG_dO_2$ (wherein, in the above chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2G_bO_4$ (wherein, in the above chemical formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The coating layer 5 may include a coating element compound of an oxide or hydroxide of a coating element, oxyhydroxide of a coating element, oxycarbonate of a coating element, or hydroxycarbonate of a coating element. The coating layer 5 may include a coating element compound of an oxide or hydroxide of a coating element, oxyhydroxide of a coating element, oxycarbonate of a coating element, or hydroxycarbonate of a coating element. The compound for the coating layer 5 may be either amorphous or crystalline. The coating element included in the coating layer 5 may be Mg, Al, Co, K, Na, Ca, Si, Ti, V, Sn, Ge, Ga, B, As, Zr, or a mixture thereof. The coating process may include a suitable processes that does not cause side effects on the properties of the positive active material (e.g., spray coating, dipping.

The positive active material layer may also include a binder and/or a conductive material.

The binder improves binding properties of positive active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. A suitable electrically conductive material may be used as a conductive material that does not cause a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, or a polyphenylene derivative and the like.

The current collector may use Al, for example.

The negative and positive electrodes may be fabricated by a method including mixing the active material, a conductive material, and a binder into an active material composition, and coating the composition on a current collector.

The electrolyte may include a non-aqueous organic solvent and a lithium salt.

The non-aqueous organic solvent serves as a medium for transmitting ions taking part in the electrochemical reaction of a battery.

The non-aqueous organic solvent may be selected from a carbonate-based, ester-based, ether-based, ketone-based, alcohol-based, or aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent includes methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent includes dibutyl ether, tetraglyme, diglyme, dimethoxyethane, 2-methyltetrahydrofuran, tetrahydrofuran, and the like, and the ketone-based solvent includes cyclohexanone, and the like. In addition, the alcohol-based solvent may be ethanol, isopropyl alcohol, and the like. The aprotic solvent may include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used alone or in combination of one or more, and a mixing ratio in the case of mixing one or more may be adjusted according to desired battery performance.

The carbonate based solvent may include a mixture of cyclic carbonate and chain-type carbonate. The cyclic carbonate and the chain-type carbonate may be mixed together in the volume ratio of about 1:1 to about 1:9. Within this range, performance of electrolyte may be improved.

The non-aqueous organic solvent may include an aromatic hydrocarbon based organic solvent, for example, in addition to the carbonate based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by Chemical Formula 1.

[Chemical Formula 1]

In Chemical Formula 1, $R_1$ to $R_6$ may each independently be hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may include an additive of vinylene carbonate or an ethylene carbonate-based compound of Chemical Formula 2 in order to improve cycle-life of a battery.

[Chemical Formula 2]

In Chemical Formula 2, $R_7$ and $R_8$ may each independently be hydrogen, a halogen group, a cyano group (CN), a nitro group ($NO_2$), or a C1 to C5 fluoroalkyl group. In an example embodiment, at least one of $R_7$ and $R_8$ is a halogen group, a cyano group (CN), a nitro group ($NO_2$), or a C1 to C5 fluoroalkyl group.

Examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the amount thereof may be adjusted to improve cycle-life.

The lithium salt dissolved in a non-aqueous organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis (oxalato) borate: LiBOB), or a combination thereof. A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARATION EXAMPLES

Preparation Example 1

A polyvinylidene fluoride-hexafluoropropylene copolymer (PVdF-HFP) (weight average molecular weight of 450,000 g/mol, XPH-883 manufactured by Solvey) latex was mixed to be 25 wt % with distilled water and then, stirred at 25° C. for 30 minutes to prepare a solution including polyvinylidene fluoride-based polymer microparticles having an average particle diameter of 200 nm. The prepared solution was mixed with acryl-based polymer microparticles having an average particle diameter of 350 nm (compound: a mixture of polystyrene, 2-ethylhexyl acrylate, and butyl acrylate; BM900B manufactured by ZEON Chemicals L.P.) to have a weight ratio of 90:10 between the PVdF-HFP latex and the acryl-based polymer microparticles. Distilled water was added thereto to have a solid content of 5 wt % in the mixed solution and then, stirred at 25° C. for 30 minutes to prepare a coating layer composition. The coating layer composition had viscosity (at 25° C.) of 4 cps.

Preparation Example 2

A polyvinylidene fluoride-hexafluoropropylene copolymer (PVdF-HFP) (weight average molecular weight: 450,000 g/mol, XPH-883 manufactured by Solvey) latex was mixed to be 25 wt % with distilled water and then, stirred at 25° C. for 30 minutes to prepare a solution including polyvinylidene fluoride-based polymer microparticles having an average particle diameter of 200 nm, and distilled water was added thereto to have a solid content of 5 wt % and then, stirred at 25° C. for 30 minutes to prepare a coating layer composition. The coating layer composition had viscosity (at 25° C.) of 2 cps.

Preparation Example 3

Distilled water was added to acryl-based polymer microparticles having an average particle diameter of 350 nm (compound: a mixture of polystyrene, 2-ethylhexyl acrylate, and butyl acrylate; BM900B manufactured by ZEON Chemicals L.P.) to have a solid content of 5 wt % and then, stirred at 25° C. for 30 minutes to prepare a coating layer composition. The coating layer composition had viscosity (at 25° C.) of 6 cps.

Comparative Preparation Example 1

A polyvinylidene fluoride-hexafluoropropylene copolymer (PVdF-HFP) (weight average molecular weight of 450,000 g/mol, XPH-883 manufactured by Solvey) latex was mixed to be 25 wt % with distilled water and then, stirred at 25° C. for 30 minutes to prepare a solution including polyvinylidene fluoride-based polymer microparticles having an average particle diameter of 200 nm. The prepared solution was mixed with acryl-based polymer microparticles having an average particle diameter of 350 nm (compound: a mixture of polystyrene, 2-ethylhexyl acrylate, and butyl acrylate; BM900B manufactured by ZEON) to have a weight ratio of 90:10 between the PVdF-HFP latex and the acryl-based polymer microparticles. Distilled water was added to the mixed solution to have a solid content of 20 wt % and then, stirred at 25° C. for 30 minutes to prepare a coating layer composition. The coating layer composition had viscosity (at 25° C.) ranging from 50 cps to 100 cps.

Example and Comparative Example

A separator having a coating layer was manufactured to have an average particle diameter of an annular pattern, a width of a ring (a ring thickness), a ratio of an area of the annular pattern relative to that of the porous substrate, and a loading amount, and using a coating method of a coating layer composition (the annular pattern), as shown in Table 1.

Example 1-1

(Preparation of Separator)
A coating layer composition of Preparation Example 1 was spray-coated under a liquid pressure of 0.2 bar and an air pressure of 0.5 bar with pulses of 60% to form a coating layer on both surfaces of a porous substrate, while the porous substrate (thickness: 12 μm, air permeability: 115 sec/100 cc; 612HS manufactured by SK) was moved at 20 m/min. Subsequently, the coated porous substrate was dried at 80° C. at a wind speed of 15 m/sec for 0.03 hours to manufacture a separator having the coating layer.

(Preparation of Coin Cell)
A positive active material, a carbon conductive agent (Denka Black, Denka Korea), and polyvinylidene fluoride (PVDF) were mixed in a weight ratio of 92:4:4 and then, with N-methyl pyrrolidone (NMP) to prepare slurry. The slurry was bar-coated on a 15 μm-thick aluminum current collector, dried at room temperature and once more at 120° C. under vacuum, and compressed and punched to manufacture a 45 μm-thick positive electrode plate.

The manufactured positive electrode plate, a lithium metal as a counter electrode, the manufactured separator, and an electrolyte prepared by dissolving 1.5 M $LiPF_6$ in a mixed solvent of EC (ethylene carbonate), DEC (diethyl carbonate), and EMC (ethylmethyl carbonate) (a volume ratio of 2:4:4) were used to manufacture a coin cell.

Example 1-2

A separator was manufactured according to the same method as Example 1-1 except that the coating layer composition of Preparation Example 2 was used instead of the coating layer composition of Preparation Example 1, and a coin cell including the same was manufactured.

Example 1-3

A separator was manufactured according to the same method as Example 1-1 except that the coating layer composition of Preparation Example 3 was used instead of the coating layer composition of Preparation Example 1, and a coin cell including the same was manufactured.

Example 2-1

A coin cell was manufactured according to the same method as Example 1-1 except that a 16 μm-thick separator (an inorganic layer including inorganic particles and having a thickness of 4 μm in total on both surfaces of a 12 μm-thick polyethylene porous substrate) was used instead of the porous substrate.

Example 2-2

A separator was manufactured according to the same method as Example 2-1 except that the coating layer composition of Preparation Example 2 was used instead of the coating layer composition of Preparation Example 1, and a coin cell including the same was manufactured.

Example 2-3

A separator was manufactured according to the same method as Example 2-1 except that the coating layer composition of Preparation Example 3 was used instead of the coating layer composition of Preparation Example 1, and a coin cell including the same was manufactured.

Comparative Example 1

A separator having a coating layer was manufactured according to the same method as Example 1-1 except that the coating layer was formed in a dip coating method, and a coin cell including the same was manufactured.

Comparative Example 2

A separator having a coating layer was manufactured according to the same method as Example 2-1 except that the coating layer was formed in a dip coating method, and a coin cell including the same was manufactured.

Comparative Example 3

A separator having a coating layer was manufactured according to the same method as Example 2-1 except that the coating layer composition was spray-coated under a liquid pressure of 0.01 bar and an air pressure of 0.1 bar with pulses of 100%, and a coin cell including the same was manufactured.

Comparative Example 4

A separator having a coating layer was manufactured according to the same method as Example 1-1 except that the coating layer composition was spray-coated under a liquid pressure of 0.04 bar and an air pressure of 0.00 bar with pulses of 100%, and a coin cell including the same was manufactured.

Comparative Example 5

A separator having a coating layer was manufactured according to the same method as Example 1-1 except that the coating layer composition of Comparative Preparation Example 1 was used instead of the coating layer composition of Preparation Example 1.

Table 1 shows average particle diameters of annular patterns, widths of rings (ring thicknesses) of the annular patterns, ratios of the areas of porous substrates relative to those of the annular patterns, loading amounts of coating layer compositions, total thicknesses of the coating layers, and coating methods of the separators according to Examples 1-1 to 1-3 and 2-1 to 2-3 and Comparative Examples 1 to 5.

Evaluation Example 2: Evaluation of Ion Conductivity Characteristics of Separator Ion conductivity of the separators according to Examples 1-1 to 1-2 and 2-1 to 2-2 and Comparative Examples 1 to 5 was measured by using an electric impedance spectroscopy measurement instrument, a VSP model manufactured by Bio-Logic SAS. Herein, an amplitude of 1000 mV at an open circuit potential and a frequency from 10000 MHz to 1 Hz was scanned.

Evaluation Example 3: Evaluation of Bending Strength Characteristics (Adherence) of Separator Electrode adherence of the separators according to Examples 1-1 to 1-2 and 2-1 to 2-2 and Comparative Examples 1 to 5 was measured. The electrode adherence was evaluated by measuring adherence (bending strength) between an active material of a substrate and each separator was measured in a 3-point bending (Instron) method. Pouch cells (a charge (1 C/36 min) state for shipping) after the formation were pressed at 5 mm/min by using a jig, and a MAX value (N, MPa) from a zero-point up to bending of 3 mm was measured. The bending strength was obtained as an average by measuring five samples and averaging three values except for a maximum value and a minimum value. The results are shown in Table 2.

Evaluation Example 4: Measurement of Separator Resistance of Coin Cell

The coin cells according to Examples 1-1 to 1-2 and 2-1 to 2-2 and Comparative Examples 1 to 5 were allowed to stand at room temperature for one day, and resistance of the separators was respectively measured by using an impedance-measuring method. The results are shown in Table 2.

Evaluation Example 5: Evaluation of High Temperature Cycle-life Characteristics

The coin cell according to Examples 1-1 to 1-2 and 2-1 to 2-2 and Comparative Examples 1 to 5 were constant current-charged at a current of a 0.1 C rate up to a voltage of 4.3 V (vs. Li) at 45° C. and then, cut off at a current of a 0.05 C

TABLE 1

| | Average particle diameter of annular pattern (μm) | Width (thickness) of ring (μm) | Area ratio of annular pattern/ porous substrate (%) | Loading amount of coating layer composition (g/m$^2$) | Total thickness of coating layer (μm) | Coating method |
|---|---|---|---|---|---|---|
| Example 1-1 | 190 | 30 | 70 | 1.2 | 1.5 | spray |
| Example 1-2 | 170 | 28 | 70 | 1.2 | 1.5 | spray |
| Example 1-3 | 230 | 45 | 70 | 1.2 | 1.5 | spray |
| Example 2-1 | 100 | 5 | 70 | 1.1 | 1.4 | spray |
| Example 2-2 | 310 | 15 | 70 | 1.1 | 1.4 | spray |
| Example 2-3 | 350 | 20 | 70 | 1.1 | 1.4 | spray |
| Comparative Example 1 | — | — | 100 | 1.3 | 1.3 | dip |
| Comparative Example 2 | — | — | 100 | 1.2 | 1.3 | dip |
| Comparative Example 3 | 150 | <1 | 30 | 0.7 | 1.4 | spray |
| Comparative Example 4 | 150 | 100 | 90 | 2.1 | 2.5 | spray |
| Comparative Example 5 | Impossible to form annular pattern | | — | 1.2 | 2.0 | spray |

Evaluation Example 1: Measurement of Air Permeability of Separator

The separators according to Examples 1-1 to 1-2 and 2-1 to 2-2 and Comparative Examples 1 to 5 were respectively cut into a size of 50 mm×50 mm to prepare each specimen. The air permeability was obtained by measuring time (sec) that it took for 100 cc of air to completely pass the specimens respectively, and the results are shown in Table 2.

rate, while 4.3 V was maintained in a constant voltage mode. Subsequently, the coin cells were discharged at a constant current of a 0.1 C rate to a voltage of 3.0 V (vs. Li) (the 1st cycle). Then, the coin cells were constant current-charged at a current of a 1.0 C rate to a voltage of 4.3 V (vs. Li) at 45° C. and cut off at a current of a 0.05 C rate, while 4.3 V was maintained in a constant voltage mode. Next, the coin cells were discharged at a constant current of a 1.0 C rate and discharged to a voltage of 3.0 V (vs. Li), whose cycle was repeated up to the 500th cycle. In all the charge and discharge cycles, a pause of 10 minutes was set by every charge/discharge cycle. The cycle life results reflecting the charge and discharge experiment results are shown in Table 2.

TABLE 2

| | Air permeability (sec/100 cc) | Ion conductivity (S/mm) | Bending strength (N) | Separator resistance (Ω) | High temperature cycle-life (45° C., 500 cycle) (%) |
|---|---|---|---|---|---|
| Example 1-1 | 120 | 0.016 | 445 | 0.65 | 88 |
| Example 1-2 | 120 | 0.018 | 310 | 0.64 | 89 |
| Example 2-1 | 140 | 0.013 | 423 | 0.71 | 89 |
| Example 2-2 | 142 | 0.015 | 308 | 0.71 | 88 |
| Comparative Example 1 | 140 | 0.0087 | 177 | 0.81 | 83 |
| Comparative Example 2 | 175 | 0.0057 | 175 | 0.84 | 81 |
| Comparative Example 3 | 118 | 0.02 | 101 | 0.06 | 10 |
| Comparative Example 4 | 260 | 0.0021 | 270 | 1.21 | 70 |
| Comparative Example 5 | 370 | 0.0079 | 280 | 1.75 | 60 |

Referring to Table 2, the separators of the Examples exhibited air permeability maintained in a range of 120 to 142 sec/100 cc and simultaneously, improved ion conductivity of 0.013 to 0.018 S/mm and in addition, bending strength of 308 to 445 N, and thus greatly improved adherence between an electrode and a separator, as compared with the separators of Comparative Examples.

In addition, the coin cells of the Examples exhibited improved separator resistance and in addition, high temperature cycle-life characteristics of greater than or equal to 88% at the 500th cycle, and thus improved cycle-life characteristics as compared with the coin cells of Comparative Examples.

Evaluation Example 6: Measurement of Scanning Electron Microscope (SEM) Image

Figure 4:
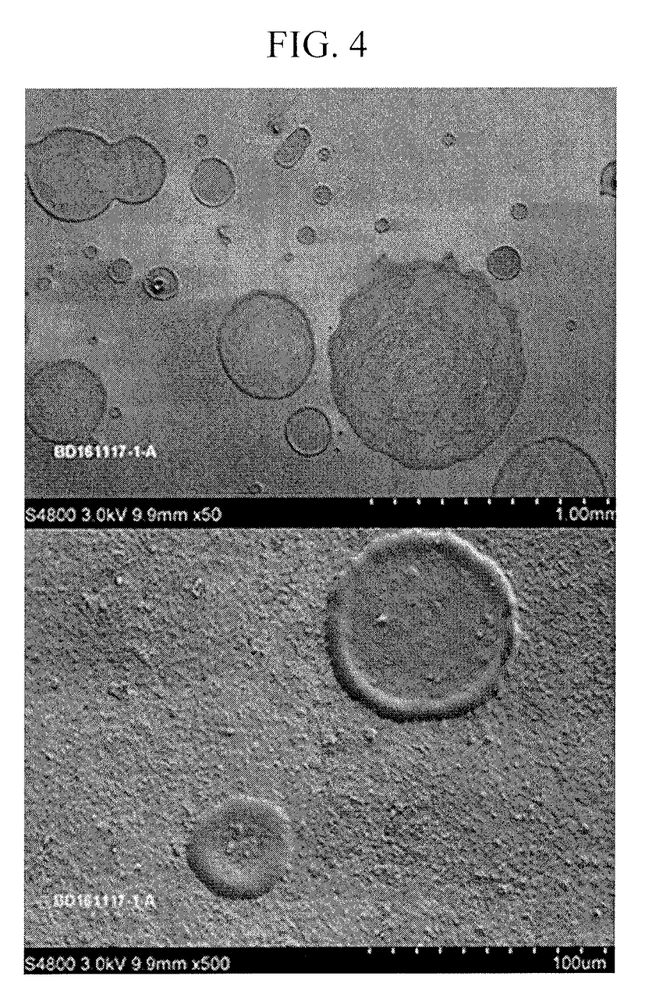
FIG. 4 illustrates a scanning electron microscope (SEM) image showing the coating layer formed on one surface of the porous substrate prepared according to Example 1.
Figure 5:
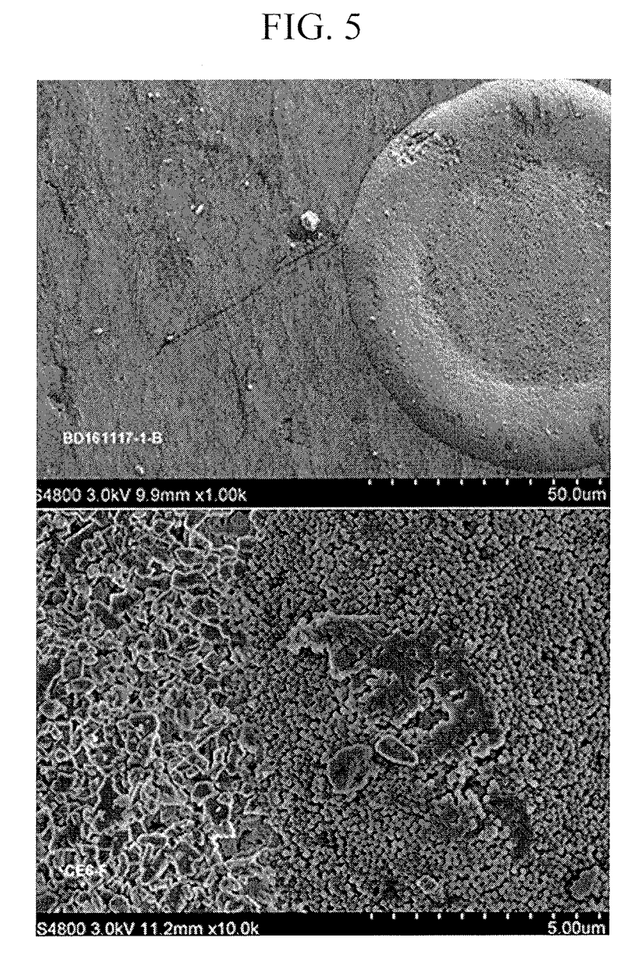
FIG. 5 illustrates a scanning electron microscopic (SEM) image that enlarges FIG. 4.

FIG. 4 is a scanning electron microscope (SEM) image of the coating layer formed on one surface of the porous substrate prepared according to Example 1, and FIG. 5 is a scanning electron microscopic (SEM) image that enlarges FIG. 4.

Referring to FIGS. 4 and 5, the separator had the coating layer including an annular pattern according to an example embodiment, and the annular pattern had an average particle diameter of 50 to 500 μm and a ring thickness of 5 to 50 μm. In addition, a plurality of polymer microparticles were present in a ring of the annular pattern, but the polymer microparticles were not substantially present in the other regions except for the ring (an inner region of the annular pattern).

By way of summation and review, in the case of manufacturing a rechargeable lithium battery, if the electrode and the separator are not properly bonded, repeated shrinkage and expansion of positive and negative electrodes during charging and discharging of the lithium battery may cause deformation of the battery and problems in battery performance and stability by a non-uniform reaction of a battery reaction.

When a rechargeable lithium battery is externally shorted, a large current may flow and generate heat, thereby increasing a battery temperature and potentially starting a thermal runaway, which may lead to an operation of a safety valve or ignition due to evaporation of an electrolyte or heat-generation. In order to prevent this, a porous body including a heat-melting resin such as polyolefin may be used in the separator. When the temperature inside the battery rises above a certain temperature, the separator melts to block the openings, thereby a shutdown function of stopping a reaction of a battery and suppressing heat-generation may be applied.

However, in the case of a large rechargeable battery for power storage or a vehicle, heat dissipation may be poor, and when overheating occurs inside the rechargeable battery, a temperature of a rechargeable battery may increase to 400 to 500° C. in a short time. If this condition persists, a meltdown or melt cracking of the separator may occur, which may cause a short circuit current to flow due to a contact between the electrodes, and an exothermic state may cause thermal runaway.

A general rechargeable lithium battery may be manufactured by a process of disposing a separator between a positive electrode and a negative electrode, spiral-winding them, and then optionally heating and compressing the resultant at a constant temperature and pressure. This compressing process may increase adherence at an interface of the positive electrode and the separator, and at an interface of the negative electrode and the separator, but may decrease discharge capacity as the charge and discharge cycles of the rechargeable lithium battery progress and may deteriorate high-rate charge and discharge characteristics.

With a view to the above, a separator having a coating layer coated with a mixture of a plurality of binder polymers and inorganic materials may be prepared on at least one surface of the porous substrate, but the coating layer may have a large amount of binder polymer on the surface of the separator to increase adhesion to the electrode, in which case the binder polymer and electrolyte solution may cause a side reaction, causing separator swelling. This may lead to deterioration of ion conductivity and cycle-life deterioration of the battery.

By comparison, as described above, by improving the adherence between the electrode and separator and reducing a resistance between the interfaces, battery's cycle-life characteristics may be improved according to an example embodiment.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

1: annular pattern
3: ring
5: coating layer
7: porous substrate
100: rechargeable lithium battery
112: negative electrode
113: separator
114: positive electrode
120: battery case
140: sealing member

What is claimed is:

1. A separator for a rechargeable battery, the separator comprising:
a porous substrate; and
a coating layer including a plurality of annular patterns on at least one surface of the porous substrate, wherein:
the annular patterns include a plurality of polymer microparticles,
the annular patterns have an average particle diameter (D50) of about 50 µm to about 500 µm,
rings of the annular patterns have a ring width of about 5 µm to about 50 µm, and
a total area of the annular patterns is about 40% to about 80% of a total area of the porous substrate, and a total area of ring portions of the annular patterns is about 10% to about 40% of the total area of the porous substrate.

2. The separator as claimed in claim 1, wherein the annular patterns have an average particle diameter (D50) of about 80 µm to about 350 µm.

3. The separator as claimed in claim 1, wherein the annular patterns have a ring width of about 5 µm to about 45 µm.

4. The separator as claimed in claim 1, wherein the polymer microparticles include polyvinylidene fluoride-based polymer microparticles, (meth)acryl-based polymer microparticles, or a mixture thereof.

5. The separator as claimed in claim 4, wherein the polymer microparticles include the polyvinylidene fluoride-based polymer microparticles, and the polyvinylidene fluoride-based polymer microparticles include one or more of polyvinylidene fluoride, polyvinylidene fluoride-co-hexafluoropropylene, or polyvinylidene fluoride-co-trichloroethylene.

6. The separator as claimed in claim 4, wherein the polymer microparticles include the (meth)acryl-based polymer microparticles, and the (meth)acryl-based polymer microparticles include one or more of polyacrylate, polymethacrylate, polybutylacrylate, or polyacrylonitrile.

7. The separator as claimed in claim 1, wherein an average particle diameter (D50) of the polymer microparticles is about 100 nm to about 600 nm.

8. The separator as claimed in claim 1, wherein the annular patterns have a loading amount on the porous substrate of about 0.5 g/m$^2$ to about 1.5 g/m$^2$.

9. The separator as claimed in claim 1, wherein the coating layer has a thickness of about 0.1 µm to about 5 µm.

10. A rechargeable lithium battery, comprising:
a positive electrode including a positive active material;
a negative electrode including a negative active material;
the separator as claimed in claim 1 disposed between the positive electrode and the negative electrode; and
an electrolyte solution.

11. A method of preparing a he separator as claimed in claim 1, the method comprising:
mixing water with at least one of polyvinylidene fluoride-based polymer microparticles, (meth)acryl-based polymer microparticles, and a mixture thereof to prepare a coating layer composition; and
coating the coating layer composition on at least one surface of a porous substrate by a spray coating method and drying the same,
wherein the spray coating method is performed by spraying at room temperature with an air pressure of about 0.2 bar to about 3.0 bar and a pulse of about 20% to about 80%.

12. The method as claimed in claim 11, wherein the coating layer composition has a viscosity of about 0.1 cps to about 10 cps.

13. The method as claimed in claim 11, wherein the coating layer composition include the polyvinylidene fluoride-based polymer microparticles and the (meth)acryl-based polymer microparticles in a weight ratio of about 90:10 to about 50:50.

14. The method as claimed in claim 11, wherein an average particle diameter (D50) of the polyvinylidene fluoride-based polymer microparticles is about 100 nm to about 300 nm.

15. The method as claimed in claim 11, wherein an average particle diameter (D50) of the (meth)acryl-based polymer microparticles is about 300 nm to about 600 nm.

16. A separator for a rechargeable battery, the separator comprising:
a porous substrate; and
a coating layer including a plurality of annular patterns on at least one surface of the porous substrate, wherein:
the annular patterns include a plurality of polymer microparticles,
the annular patterns have an average particle diameter (D50) of about 50 µm to about 500 µm,
rings of the annular patterns have a ring width of about 5 µm to about 50 µm, and
the annular patterns have a loading amount on the porous substrate of about 0.5 g/m$^2$ to about 1.5 g/m$^2$.

17. A rechargeable lithium battery, comprising:
a positive electrode including a positive active material;
a negative electrode including a negative active material;
the separator as claimed in claim 16 disposed between the positive electrode and the negative electrode; and
an electrolyte solution.

* * * * *